United States Patent
Romero Calvo et al.

(10) Patent No.: US 12,124,440 B1
(45) Date of Patent: Oct. 22, 2024

(54) CONVERTING NATURAL LANGUAGE QUERIES TO SQL QUERIES USING ONTOLOGICAL CODES AND PLACEHOLDERS

(71) Applicant: Amazon Technologies, Inc., Seattle, WA (US)

(72) Inventors: Miguel Romero Calvo, Los Altos, CA (US); Tesfagabir Meharizghi, Santa Clara, CA (US); Thiruvarul Selvan Senthivel, Snoqualmie, WA (US); Saman Sarraf, San Jose, CA (US); Lin Lee Cheong, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 17/473,146

(22) Filed: Sep. 13, 2021

(51) Int. Cl.
*G06F 16/00* (2019.01)
*G06F 16/242* (2019.01)
*G06F 16/2452* (2019.01)

(52) U.S. Cl.
CPC .... *G06F 16/24522* (2019.01); *G06F 16/2433* (2019.01)

(58) Field of Classification Search
CPC .......... G06F 16/24522; G06F 16/2433; G06F 16/245; G06F 40/10; G06F 11/3664; G06F 40/30; G06F 16/367; G16H 50/70; G16H 10/60
See application file for complete search history.

(56) References Cited

U.S. PATENT DOCUMENTS

| | | | |
|---|---|---|---|
| 8,140,556 B2 | 3/2012 | Rao et al. | |
| 8,924,197 B2 | 12/2014 | Pragada et al. | |
| 2015/0356647 A1* | 12/2015 | Reiser | G06Q 30/04 705/3 |
| 2016/0147637 A1* | 5/2016 | Bhagavan | G06F 16/245 717/127 |
| 2021/0303555 A1* | 9/2021 | Kim | G06F 16/90332 |
| 2021/0319859 A1* | 10/2021 | Reumann | G16H 15/00 |
| 2022/0083605 A1* | 3/2022 | Duishoev | G06N 5/02 |
| 2022/0414075 A1* | 12/2022 | Li | G06F 16/217 |

* cited by examiner

*Primary Examiner* — Alex Gofman
*Assistant Examiner* — Suman Rajaputra
(74) *Attorney, Agent, or Firm* — Robert C. Kowert; Kowert, Hood, Munyon, Rankin & Goetzel, P.C.

(57) ABSTRACT

An NLQ-SQLQ tool or service of a provider network may receive a natural language query (NLQ) from a client and convert the NLQ to an SQL query using ontological codes and placeholders. For one or more portions of the NLQ, the tool/service determines that the portion is associated with one or more codes of an ontology. The tool/service then assigns, based on criteria, a particular code to the portion. The tool/service replaces portions of the NLQ with different argument placeholders to generate a modified NLQ. A trained model converts the modified NLQ into an initial SQL query that has argument placeholders and subquery placeholders. The tool/service generates a final SQL query based on the initial SQL query, predefined SQL subquery templates associated with the subquery placeholders, and codes associated with the argument placeholders. The tool/service executes the final SQL query and sends results to the client.

20 Claims, 7 Drawing Sheets

302

▼ DB Credentials

User: [master]     Password: [--------]     [Set Data Credentials]

| Main | Correct detection | Correct code map |

Query: [Number of patients taking Aspirin                    ]

[Detect]   [Execute]

- The following key entities have been detected:

Number of patients taking [Aspirin DRUG]

- Drugs and Conditions will be respectively replaced by the following RxNorm/ICD10 codes:

Number of patients taking [1191 DRUG]

- Prededicted SQL query:

-SELECT COUNT{ DISTINCT pe.person_id} FROM {<SCHEMA>.person pe JOIN {<DRUG-TEMPLATE><ARG-DRUG><0> JOIN <SCHEMA>.drug_exposure dr ON concept_id=drug_concept_id} ON pe.person_id=dr.person_id};'

- Rendered SQL query:

"SELECT COUNT (DISTINCT pe.person_id) FROM (cms.person pe JOIN {{ SELECT descendant_concept_id AS concept_id FROM (SELECT * FROM {SEELCT concept_id_2 FROM { {SELECT concept_id FROM cms.concept WHERE ontology_id='RxNorm' AND { concept_code='1191' }} JOIN { SELECT concept_id1, concept_id2 FROM cms.concept_relationship WHERE releationship_id='Maps to' ) ON concept_id=concept_id1} } JOIN cms.concept ON concept_id2=concept_id} JOIN cms.concept_ancestor ON concept_id=ancestor_concept_id } JOIN cms.drug_exposure dr ON concept_id=drug_concept_id} ON pe.person_id=dr.person_id};"

- Request run successfully ☑ . Results in the following table:

| count |
|-------|
| 610409 |

[Clear Output]          Feedback: ● Successful    [Submit feedback]
                                  ○ Unsuccessful

*FIG. 3*

CONVERTING NATURAL LANGUAGE QUERIES TO SQL QUERIES USING ONTOLOGICAL CODES AND PLACEHOLDERS

BACKGROUND

As various computing applications become more sophisticated and widespread, the ability for applications to convert natural language queries (NLQs) to structured query language queries (SQLQs) has become more important. For example, many users that have relatively little or no technical knowledge regarding SQL statements may nevertheless retrieve a variety of data from a database by simply providing an NLQ (e.g., submitting a question via a graphical user interface). However, conversion of NLQs into SQLQs may not be available for certain domains. For example, conversion of NLQs into SQLQs in the healthcare and life sciences (HCLS) domain present complexities (e.g., different medical ontologies/codes) that prevent traditional conversion approaches to be applied. Therefore, a user with insufficient technical knowledge with respect to SQL may be unable to retrieve data in certain domains.

BRIEF DESCRIPTION OF THE DRAWINGS

FIG. 3 illustrates an example of a user interface for converting a natural language query to an SQL query and displaying results, according to some embodiments.

Figure 1:
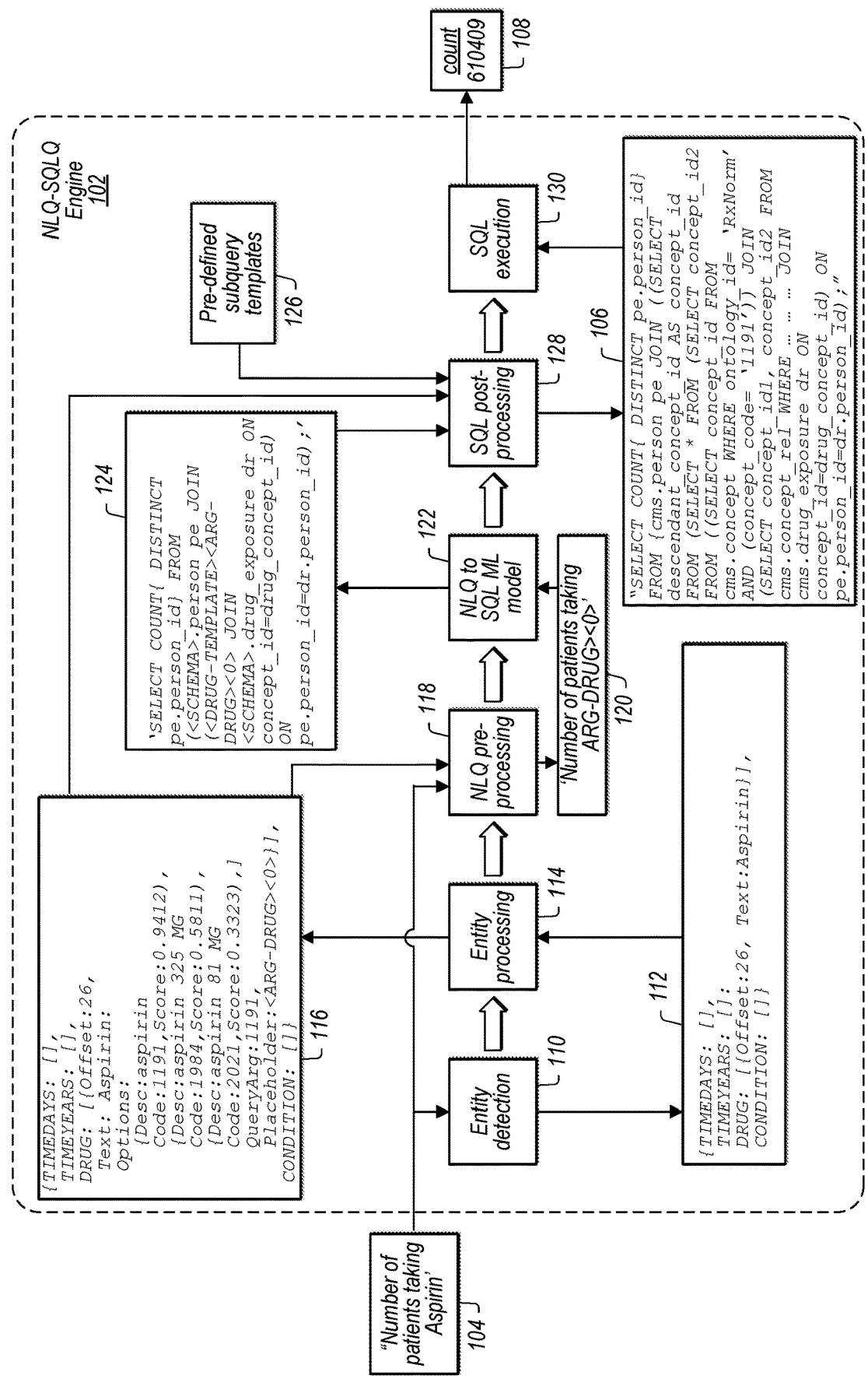
FIG. 1 illustrates an example of converting a natural language query to an SQL query using ontological codes and placeholders, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement converting a natural language query to an SQL query using ontological codes and placeholders, according to some embodiments. In embodiments, converting a natural language query to an SQL query using ontological codes and placeholders may allow a user with relatively little or no technical knowledge regarding SQL statements to retrieve data from a database for certain domains (e.g., HCLS or other ontological-based data domains) by providing an NLQ, whereas the user would be unable to do so using traditional techniques.

Embodiments may reduce the amount of time to retrieve data and/or reduce or eliminate data retrieval errors even for users with strong SQL skills, compared to traditional techniques. For example, using traditional techniques, a user (e.g., physician or other user) may be required to navigate multiple pages of a graphical user interface (GUI) in order to specify various details for a query. Embodiments described herein may lower the access barrier for non-technical users (e.g., physicians, business users, etc.) and reduce information retrieval times.

In embodiments, natural language to SQL models may refer to machine learning-based processes (ML-based processes) to convert queries in natural language into SQL statements to query a given database. Traditional techniques for using models may not be directly applied to certain data domains/fields, such as Health Care and Life Science (HCLS), for various reasons. For example, different database records in the HCLS domain may be stored as codes according to one or more ontologies (e.g., ICD10, SNOMED, RxNorm ontologies), but a natural language query may refer to a name instead of the code (e.g., "insomnia" instead of "G47.00" in the ICD10 ontology). An ontology may also have a hierarchical structure. For example, querying for a drug or health condition may involve querying for a code and the code's descendants (e.g., drugs with specific dosages or formats). Therefore, longer queries may be needed in order to retrieve information in the HCLS domain. Ontology codes may also be updated at any time (e.g., periodically or at various other times), resulting in dynamically changing codes over time.

Embodiments may provide a tool/service that leverages models (e.g., trained ML models) and allows for the converting of a natural language query to an SQL query in the HCLS domain or any other data domains with similar characteristics/complexities (e.g., fields where users query by names that are not directly reflected in at least some or all of the tables within a schema). In embodiments, predefined SQL subquery templates are defined and stored. The functionality of the predefined SQL subquery templates may be to map a given ontology code to one or several Observational Medical Outcomes Partnership (OMOP) Common Data Model (CDM) codes (or other types of CDM codes, in various embodiments).

The tool/service may use models and/or custom entity recognition rules to identify and/or classify the parts of the sentence (e.g., the NLQ) necessary to compose a final SQL query and/or that need to be disambiguated into medical codes in order to compose the final SQL query (or other types codes, in various embodiments). The parts of the sentence are then replaced by key arguments (e.g., <ARG-DRUG><0> for the first drug occurrence) to create a modified natural language query (e.g., a "generic query"). In an embodiment, the tool/service may disambiguate drug and health condition names into RxNorm and ICD10CM codes respectively (or any other respective ontologies, in various embodiments). A user may inspect the disambiguation and modify the codes as desired via a user interface (e.g.,) provided by the tool/service. Arguments (e.g., gender, race, etc.) may be disambiguated into OMOP concepts.

In embodiments, the modified natural language query may be passed to an NLQ to SQLQ model (e.g., a trained ML model) that converts the modified natural language query into an initial SQL query with argument placeholders and subquery placeholders. In various embodiments, the model is trained to use natural language queries with argument placeholders and output modified natural language queries with argument and subquery placeholders. Therefore, any changes to the ontologies will not affect the trained model. The modified natural language query may then be rendered with predefined SQL subquery templates and arguments placeholders may be detected and disambiguated, resulting in the final SQL query that may be executed. Although the HCLS domain is used as an example, in various embodiment any of the techniques described herein may apply to any other data domain/field.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of converting a natural language query to an SQL query using ontological codes and placeholders. An example user interface is presented. A system for converting a natural language query to an SQL query using ontological codes and placeholders is also discussed. A number of different methods and techniques to implement converting a natural language query to an SQL query using ontological codes and placeholders, some of which are illustrated in accompanying flowcharts. Finally, a description of an example computing system upon which the various components, modules, systems, and/or techniques described herein may be implemented is provided. Various examples are provided throughout the specification.

FIG. 1 illustrates an example of converting a natural language query to an SQL query using ontological codes and placeholders, according to some embodiments.

In the depicted example, an NLQ-SQLQ engine 102 receives an NLQ 104, converts the NLQ 104 to an SQLQ 106 through the use of ontological codes and placeholders, and executes the SQLQ 106 to generate one or more results (e.g., result 108). In embodiments, the NLQ-SQLQ engine 102 may be implemented as part of an NLQ-SQLQ tool as discussed for FIG. 2 or as part of an NLQ-SQLQ service as discussed for FIG. 4.

In some embodiments, the engine 102 performs entity detection 110 on the NLQ 104. For any number of different portions of the NLQ (e.g., different words or groups of words of the NLQ), the engine may determine whether the portion of the NLQ is associated with one or more codes of an ontology (e.g., whether the portion may be disambiguated into a medical code).

In embodiments, a given ontology may include a plurality of codes that are respectively associated with one or more words. In the depicted example, an ontology includes the codes 1191, 1984, and 2021 that are each associated with the word "Aspirin." The same ontology might include the code 2000 that is associated with the words "high cholesterol." In various embodiments, a given word (or series of words such as "high cholesterol") may be associated with any number of codes of the ontology (e.g., one or more codes).

In the depicted embodiment, the engine determines that the word "Aspirin" is classified as a "drug" entity. The example entity data structure 112 indicates the word "Aspirin," its starting offset within the NLQ, and its classification as a drug. Note that in various embodiments, any other type/format of an entity data structure may be used. In the example, the engine only determines that one portion of the NLQ (the word "Aspirin") is associated with one or more codes of an ontology. However, in various embodiments, the engine may determine that any number of different portions of an NLQ are each associated with a different code of an ontology. As discussed below, in various embodiments the engine may determine that different portions of an NLQ may be associated with codes of different ontologies.

After the entity detection is performed, the engine then performs entity processing 114 on the NLQ (e.g., processing the data in the entity data structure 112). This may include assigning, based on one or more criteria, one of the one or more codes of the ontology to the portion of the natural language query (e.g., to the word "Aspirin"). For example, the engine may determine that the portion of the natural language query ("Aspirin") is associated with different codes of the ontology, as shown in the example data structure 116 (Aspirin is associated with the codes 1191, 1934, and 2021).

The engine may calculate, based at least on analysis of the natural language query (e.g., using a trained ML model), a different confidence value for each of the different codes of the ontology. In embodiments, a given confidence value for a given code is proportional to a likelihood that the given code is a correct match for the portion of the natural language query. For example, the confidence level for code 1191 is 0.9412, the confidence level for code 1984 is 0.5811, and the confidence level for code 2021 is 0.3323. In response to determining that the confidence level calculated for code 1191 is highest among the different confidence values, the engine assigns code 1191 to the portion of the NLQ ("Aspirin").

The engine may also determine an argument placeholder for the portion of the NLQ ("Aspirin") and a type/category for the argument placeholder (e.g., "drug" for medications, "condition" for health conditions). As shown in the example data structure 116, the engine determines that the argument placeholder for "Aspirin" will be <ARG-DRUG><0> (in this example, "DRUG" reflects the fact that the argument placeholder is for a medication—Aspirin). Therefore, the argument placeholder <ARG-DRUG><0> for the particular portion of the NLQ ("Aspirin") is associated with the code that is assigned to that particular portion (1191). In other words, the argument placeholder <ARG-DRUG><0> is linked/mapped to the code 1191.

In embodiments, any number of argument placeholders may be determined to uniquely identify any number of portions of a given NLQ that have been assigned a code from an ontology. For example, if, during entity detection and entity processing, the engine determined that two additional portions of the NLQ are each associated with one or more codes of an ontology, then two additional argument placeholders may be determined for those portions (e.g., <ARG-DRUG><1> and <ARG-DRUG><2>), each linked/mapped to two additional codes.

After entity processing 114, the engine then performs NLQ pre-processing 118 on the NLQ (e.g., processing the NLQ and the data in the entity data structure 114). This may include replacing one or more portions of the natural language query (e.g., Aspirin) with a different argument placeholder (e.g., <ARG-DRUG><0>) to generate a modified NLQ 120 that includes one or more argument placeholders (e.g., "Number of patients taking <ARG-DRUG><0>").

The engine may then provide the modified NLQ 120 as input to a trained model (e.g., NLQ to SQL ML model 122). In embodiments, the model 122 may be trained by a provider network or other entity using any training data from one or more sources (e.g., the provider network, any number of clients) to create a baseline trained model. In embodiments, the baseline trained model may be further trained/updated based on feedback from a client/user (e.g., the user that provided the NLQ).

As shown, the trained model 122 converts the modified NLQ into an initial SQL query 124. The initial SQL query 124 includes the one or more argument placeholders (e.g., <ARG-DRUG><0>) and one or more subquery placeholders (e.g., <DRUG-TEMPLATE>) that are each associated with a predefined SQL subquery template 126 (e.g., stored/maintained by a tool/service). In an embodiment, the model 122 may determine/select a particular subquery placeholder to be included in the initial SQL query based on identifying the type/category for one or more of the argument placeholders (e.g., "drug" for medications, "condition" for health conditions) and/or based on identifying/classifying other portions of the modified NLQ (e.g., "Number," "of," "patients," "taking").

The engine may then perform SQL post-processing 128 to generate a final SQL query 106 based at least on the initial SQL query 124, the one or more predefined SQL subquery templates associated with the one or more subquery placeholders (e.g., a predefined SQL subquery template 126 associated with <DRUG-TEMPLATE>). In embodiments, the engine replaces the one or more subquery placeholders with one or more predefined SQL subquery templates that are associated with the one or more subquery placeholders. In the depicted example, the engine replaces <DRUG-TEMPLATE> with a particular predefined SQL subquery template (a portion of the predefined SQL subquery template is depicted; an example of the entire subquery may be seen in FIG. 3).

In embodiments, the engine also modifies the one or more predefined SQL subquery templates to include the one or more codes. In the depicted example, the engine modifies the particular predefined SQL subquery template to include the code 1191. In various embodiments, this may be performed for any number of different subquery templates and/or ontology codes to generate a final SQL query.

The engine may then execute the query (e.g., query execution 130) to generate one or more results 108 (e.g., count=610409, indicating the number of patients taking Aspirin as the answer to the NLQ 104). In the depicted embodiment, the various functions are performed by an engine 102. However, in embodiments, any of the functionality of the engine may be performed by another component or service. For example, the SQL execution 130 may be performed by a separate database service or data warehouse service.

Figure 2:
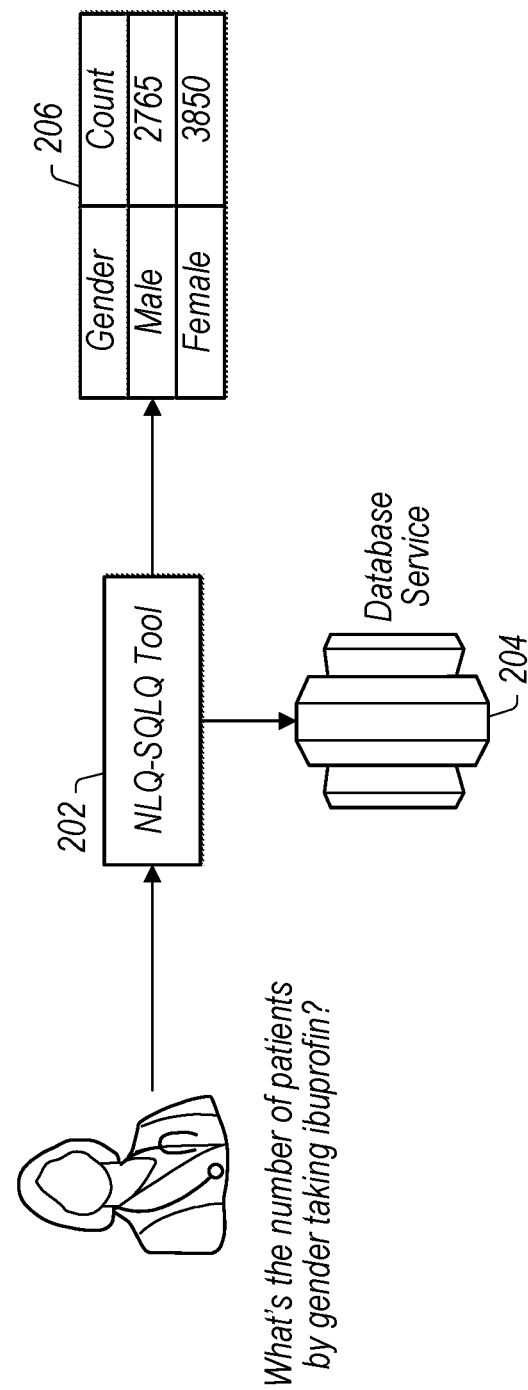
FIG. 2 illustrates an example of using an NLQ-SQL tool to convert a natural language query to an SQL query using ontological codes and placeholders, according to some embodiments.

FIG. 2 illustrates an example of using an NLQ-SQL tool to convert a natural language query to an SQL query using ontological codes and placeholders, according to some embodiments.

In the depicted embodiment, a user (e.g., a doctor) may provide an NLQ to an NLQ-SQLQ tool 202. For example, the user may enter the NLQ via a GUI, command line interface (CLI), or other type of interface of a computing device (e.g., a desktop computer, laptop, mobile computing device, smartphone, etc.). In some embodiments, the interface may accept speech input from the user and convert the speech input into text (e.g., using speech recognition). The computing device may send the NLQ to the NLQ-SQLQ tool 202, which may be hosted by the same computing device or may be hosted by another computing device(s) within a local network or a remote network.

In some embodiments, the NLQ-SQLQ tool 202 may include the NLQ-SQLQ engine 102 and/or perform any of the functionality described for the engine 102. In the example embodiment, the tool (e.g., using the NLQ-SQLQ engine) converts the NLQ ("What's the number of patients by gender taking ibuprofen?") into a final SQL query, in the same/similar manner as described for FIG. 1.

The tool 202 may then provide the final SQL query to a database service 204, where the query is executed to obtain one or more results from a database (e.g., from any number of tables of the database). In embodiments, the database service 204 may be hosted by the same computing device that hosts the tool 202 or may be hosted by another computing device(s) within a local network or a remote network. The result is provided to the tool 202, which then provides the result to a client (e.g., via a GUI). As shown, the tool 202 formats the results and displays the results to the user as a table 206 with a "Gender" column and a "Count" column, indicating the number of males taking ibuprofen and the number of females taking ibuprofen.

FIG. 3 illustrates an example of a user interface for converting a natural language query to an SQL query and displaying results, according to some embodiments.

As shown, a user has entered an NLQ ("Number of patients taking Aspirin") into a query input portion of a GUI 302. In the depicted example, the GUI includes an "Execute" button that the user may activate (e.g., via a mouse click or other input) in order to cause an NLQ-SQLQ tool/service to convert the NLQ into a final SQL query using ontological codes and placeholders, execute the final SQL query, and display results (e.g., as described for FIGS. 1 and/or 2). As shown, the GUI displays the results as a count of 610409 patients that are taking aspirin.

In the depicted example, the GUI includes a "Detect" button that the user may activate (e.g., via a mouse click or other input) in order to cause an NLQ-SQLQ tool/service to convert the NLQ into a final SQL query using ontological codes and placeholders (e.g., as described for FIGS. 1 and/or 2) and to display various intermediate results as well as the final SQL query, as described below.

In the example embodiment, the GUI displays the NLQ along with the word "DRUG" adjacent to the word "Aspirin," which indicates that the tool/service has determined that the word portion/word of the NLQ "Aspirin" has been classified as a "drug" entity. As shown, the tool highlights the two words by surrounding them with a box to indicate that the tool/service has made the above determination. Any other technique may be used to visually indicate this determination. Although the current example shows just one of the words of the NLQ has been classified as a particular entity, in various embodiments, any number of words of the NLQ may be classified as another type of entity or a different entity. For example, an NLQ may include three different "drug" entities and two different "health condition" entities.

The GUI also displays the same highlighted NLQ as described above, except the word "Aspirin" has been replaced by the code "1191," which indicates the code from the ontology that the tool/service assigned to that portion of the query ("Aspirin"). As shown, the GUI also displays the initial SQL query under the label "Predicted SQL query." The GUI also displays the final SQL query under the label "Rendered SQL query."

In the depicted embodiment, the user may provide feedback to the tool service by selecting the "successful" radio button if the user decides that the results and/or the final SQL query was successfully provided, or by selecting the "unsuccessful" radio button if the user decides that the results and/or the final SQL query was not successfully provided. The user may then submit the results to the tool/service by activating the "submit feedback" button. The tool/service may use the feedback to update/modify one or more models that are used to convert NLQs to final SQL queries.

In embodiments, the tool/service may allow a user to change/modify, via the GUI or any other type of interface, any of the one or more intermediate results that the tool/service generates/displays (e.g., assigned codes, modified NLQ, initial SQL query) as well as the final SQL query. For example, the user may edit any portions of the assigned codes, modified NLQ, initial SQL query, and/or final SQL query and then activate the "Execute" button to generate a new final SQL query based on the edits and to execute the new final SQL query. In embodiments, the tool/service may use the edits as feedback to update/modify one or more models that are used to convert NLQs to final SQL queries.

For example, the tool/service may provide, to the client (e.g., a user of the client company/organization), an indication of the one or more codes assigned to the one or more portions of the natural language query ("1191" in the depicted example). The tool/service may receive, from the client, an indication to change a particular one of the one or more codes ("1191") that is assigned to a particular one of the one or more portions of the natural language query ("Aspirin") to a different code (e.g., "1984"). For example, the client may edit/change the highlighted portion from "1191 DRUG" to "1984 DRUG."

The client may then activate the "Execute" button (or perform another action) to submit/indicate the changes to the tool/service. In response to the tool receiving the indication to change the particular code to the different code, the tool may assign the different code ("1984") to the particular portion of the natural language query ("Aspirin") and generate a new final SQL query based on the new code (e.g., performing the various steps described for FIG. 1 to convert the NLQ to a final SQL query, using "1984" instead of "1191" for the code.

In embodiments, in response to receiving the indication of the different code, the tool/service may perform one or more updates to a model (e.g., a classification model and/or ML model) based the different code, the particular portion of the natural language query, and/or one or more other portions of the natural language query (e.g., contextual words of the NLQ). The updates may improve the accuracy of the model to assign codes to subsequently received NLQs that portions that are the same or similar to the particular portion, resulting in fewer corrections by a user.

In an embodiment, the tool/service may provide, to the client, an indication of the final SQL query and receive, from the client, a modification to be applied to the final SQL query. For example, the client may edit/change the final SQL query (e.g., change tables, conditions, columns, or any other portions/elements of the final SQL query). The client may then activate the "Execute" button (or perform another action) to submit/indicate the changes to the tool/service. This may be useful for clients with some technical knowledge of SQL and/or knowledge of how the ontologies are stored the database or how the ontology codes map to OMOP CDM codes in the database tables (e.g., by verifying the final SQL query before executing the query).

In response to the tool receiving the modification to be applied to the final SQL query, the tool/service may apply the modification to the final SQL query and then execute the new final SQL query. In some embodiments, the original final SQL query may be executed, the client may make the changes to the final SQL query, and then execute the new final SQL query (e.g., if the client is unsatisfied with the results and decides to change the final SQL query). As shown, the GUI may allow a user to enter credentials (e.g., username and database password) and to gain access to the database by activating the "set data credentials" button. A "clear output" button may also be provided if the user wishes to remote the any of the information and/or results from the GUI.

Figure 4:
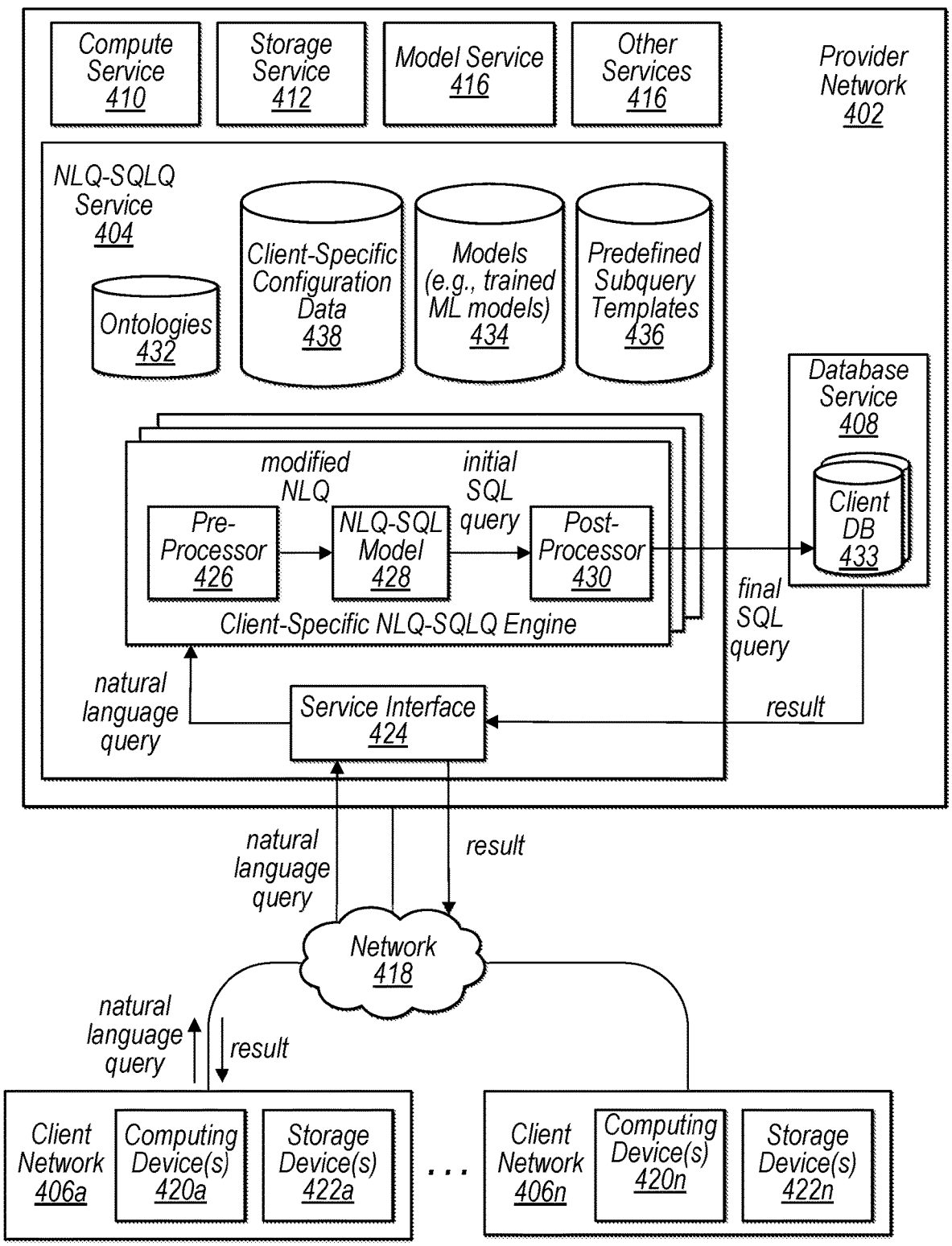
FIG. 4 is a logical block diagram illustrating a system for converting a natural language query to an SQL query using ontological codes and placeholders, according to some embodiments.

FIG. 4 is a logical block diagram illustrating a system for converting a natural language query to an SQL query using ontological codes and placeholders, according to some embodiments.

As shown, a service provider network 402 may include an NLQ-SQLQ service 404 that may be used by users of any number of clients that each own/manage a remote client network 406. The provider network may include a database service 408 (e.g., a data warehouse service), a compute service 410, a storage service 412, model service(s) 415, and any number of other services 416 that may be used by the NLQ-SQLQ service 404 and/or clients. For example, the NLQ-SQLQ service 404 may use storage devices of the storage service 412 to store at least some data and/or use the compute service 410 to execute at least some models.

Users may access the provider network 402, including the NLQ-SQLQ service 404 and other services, by communicating with the provider network 402 via a wide area network 418 (e.g., the Internet). In embodiments, any number of the users may access the provider network via stand-alone device (e.g., a smart phone or other mobile/cellular device) or a computing device 420 (e.g., a GUI of the computing device) that is part of a local client network (e.g., a private network of a company). As shown, each client network may include any number of computing devices 420 and/or storage devices 422.

In the example embodiment, a user may send an NLQ (e.g., using a GUI of a remote client device, such as computing device 420) to a service interface 424 (e.g., application programming interface) of the NLQ-SQLQ service 404. The NLQ-SQLQ service 404 may authenticate and/or authorize the user based on credentials provided by the user (e.g., provided via a GUI as in FIG. 3). The NLQ may be included as part of a request that also includes the user credentials (e.g., unique user ID, user password). In some embodiments, the NLQ-SQLQ service 404 may send the user credentials to another service of the provider network (e.g., an identity and access management service)

that performs the authentication and/or authorization of the user based on the user credentials. The NLQ-SQLQ service 404 may then receive, from the other service, an indication of whether the user is authenticated and/or authorized. If not, the request is denied. Otherwise, the NLQ-SQLQ service 404 processes the NLQ and provides one or more results to the user.

In embodiments, the NLQ-SQLQ service 404 may perform any or all of the functionality of the NLQ-SQLQ engine 102 described for FIG. 1 in order to convert the natural language query to a final SQL query. As shown, the service 404 may receive the NLQ via the interface 424 and then send the NLQ to a pre-processor 426 to perform various functions/steps (e.g., described in FIG. 1) to generate a modified NLQ based on the NLQ.

The service 404 may then provide the modified NLQ to the NLQ-SQL model 428. The NLQ-SQL model 428 processes the modified NLQ (e.g., as described in FIG. 1) to generate an initial SQL query. The service 404 may then provide the initial NLQ to a post-processor 430. The post-processor 430 processes the initial SQL query (e.g., as described in FIG. 1) to generate a final SQL query, which is sent to a client database 433 of the database service for execution. In embodiments, each client of the service (e.g., a company or other client organization that may have any number of users that use the service) may have at least one client database 432 of the database service 408 that are owned/managed by the client (e.g., a database of the client that the client created in the database service). The interface 424 receives the result(s) from the database service and provides the result(s) to the user/client via the GUI (e.g., after formatting/processing by the interface 424 and/or the GUI).

As shown, the service 404 may store any number of ontologies 432 (e.g., including any codes used by the ontologies), any number of models 434 (e.g., used by the service at any steps to convert the NLQ), and/or any number of predefined SQL subquery templates 436 for use by the service to convert NLQs to final SQL queries. In embodiments, at least some of the above data may be stored by a separate storage service 412.

As depicted, the service interface may route an NLQ from remote client device of the client's network (e.g., a client that owns/manages the client network 406a) to a client-specific NLQ-SQLQ engine that includes a pre-processor 426, NLQ-SQL model 428, and post-processor 430 that is configured by the client and/or instantiated/reserved for use by the client (e.g., no other clients may use the engine or have access to the engine). In embodiments, any number of clients may each configure and instantiate their own client-specific NLQ-SQLQ engine. For example, an administrator of the client may customize an NLQ-SQLQ engine for the client by selecting and/or configuring one or more stages of the engine. In embodiments, a given client-specific NLQ-SQLQ engine may use any number of resources of the NLQ-SQLQ service and/or other services of the provider network that are dedicated for use by the client (e.g., by users of the client).

In embodiments, a client (e.g., an administrator/developer of the client) may configure any number of different aspects of the client-specific NLQ-SQLQ engine so that the client-specific NLQ-SQLQ engine (e.g., the pipeline of different stages/processes) is tailored to the particular desire/requirements of the client (e.g., users of the client). For example, the NLQ-SQLQ service may receive (e.g., via the service interface from an administrator at a remote client network) configuration input to select a particular model, model service, or other application/software code modules/functions from among multiple different models, model services, or application/software code modules/functions that are available for use by the client-specific NLQ-SQLQ engine to perform entity detection at the pre-processor stage in order to generate the modified NLQ and/or to convert the modified NLQ to the initial SQL query and/or to perform post-processing to generate the final SQL query. Therefore, the trained model that is used to generate the initial SQL query may be selected based at least on a configuration input received by the NLQ-SQLQ service. Similarly, the predefined SQL subquery templates used to generate the final SQL query may be selected based at least on configuration input received by the NLQ-SQLQ service.

In embodiments, any configuration input received by the service (e.g., to select/configure any aspects of the engine such as the particular trained model used to generate an initial SQL query) may be received via the service interface. For example, the service may receive, via the interface of the NLQ-SQLQ service, configuration input that indicates a selection of a trained model from among a plurality of trained models available for selection, or the service may receive, via the interface of the NLQ-SQLQ service, configuration input that indicates a selection of certain predefined SQL subquery templates from among a plurality of predefined SQL subquery templates available for selection (e.g., selecting 10 templates out of 100 templates available for selection). This may provide a client (e.g., the administrator of a client) flexibility in how to configure the engine for use with client-specific aspects, such as particular databases, tables, etc.

As mentioned above, models may be selected/configured for any processing stage/function of the engine. For example, the service may receive, via the interface, configuration input that indicates selection of a model (or model service) from among a plurality of models (or model services) available for selection, wherein the selected model or model service performs the assignment of a particular code (from among multiple available codes) of an ontology to the portion of the natural language query (e.g., the "entity detection/assignment" stage). In the depicted example, some or all of the configuration data provided by each client may be stored by the service (e.g., at a data store as client-specific configuration data 438), which the service may access in order to instantiate and/or execute the client-specific NLQ-SQLQ engine for each client.

Figure 5:
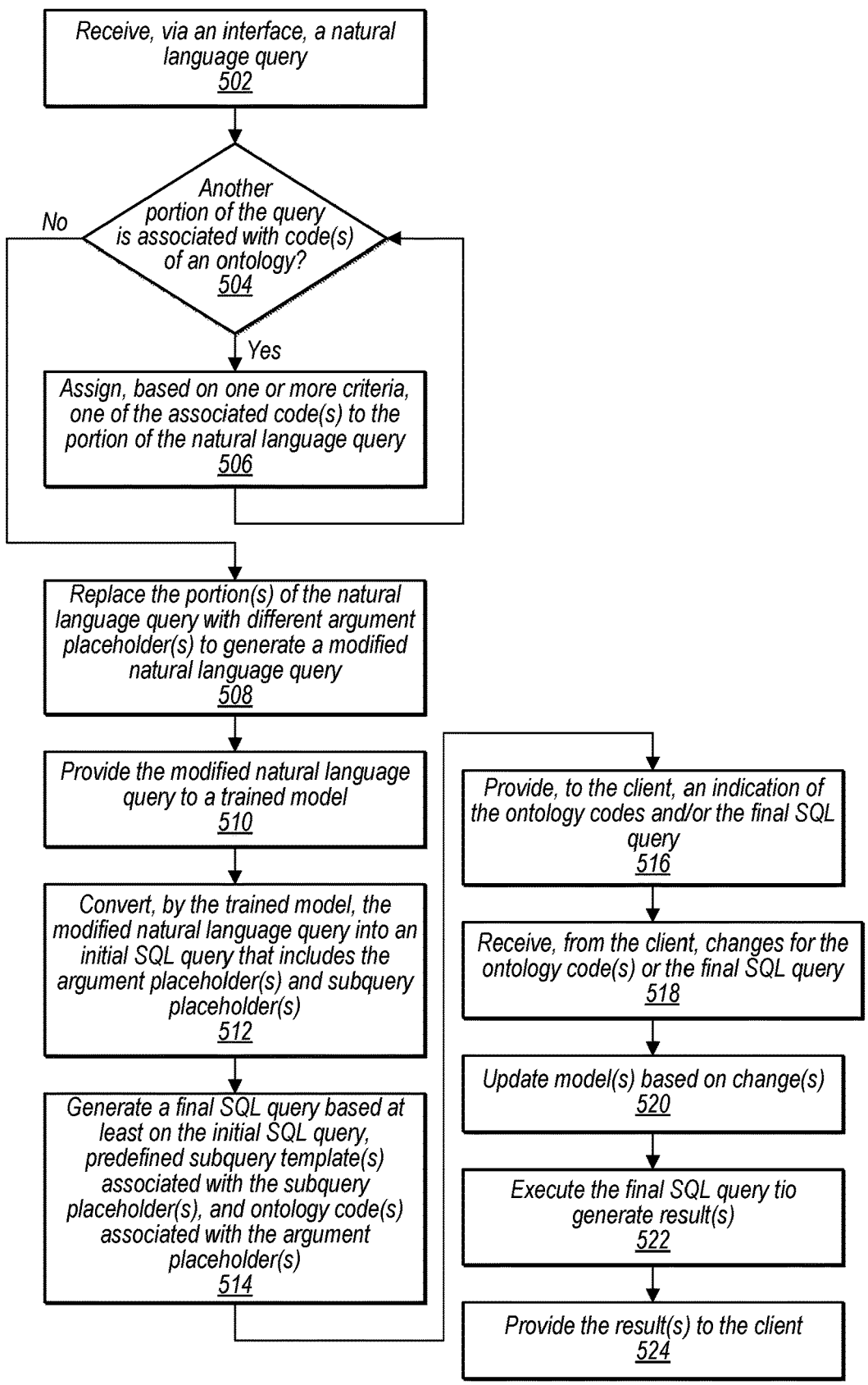
FIG. 5 is a high-level flowchart illustrating various methods and techniques to convert a natural language query to an SQL query using ontological codes and placeholders, according to some embodiments.

FIG. 5 is a high-level flowchart illustrating various methods and techniques to convert a natural language query to an SQL query using ontological codes and placeholders, according to some embodiments. In various embodiments, any of the functionality described for any portions of the flowcharts 5-6 may be performed by any of the components of FIGS. 1-4 and/or 7.

Figure 6:
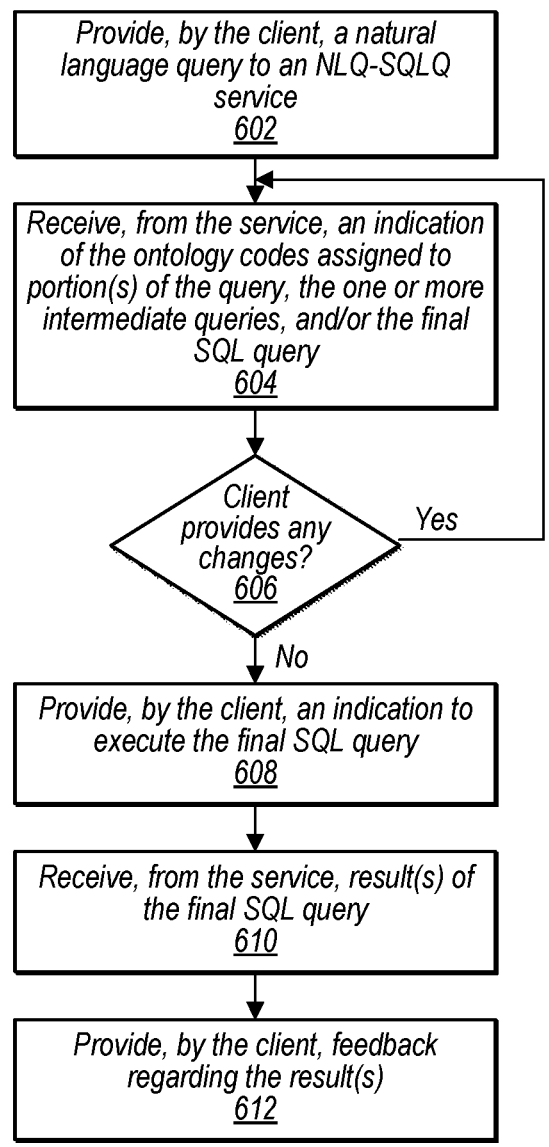
FIG. 6 is a high-level flowchart illustrating various methods and techniques to implement a user interface for converting a natural language query to an SQL query using ontological codes and placeholders, according to some embodiments.

These techniques, as well as the techniques discussed with regard to FIG. 6, may be implemented using components or systems as described above with regard to FIGS. 1-4, as well as other types of components or systems, and thus the following discussion is not intended to be limiting as to the other types of systems that may implement the described techniques. For example, the techniques may be implemented by a service/tool of a provider network and/or a local service/tool at a client network.

At block 502, the NLQ-SQLQ service receives, via an interface, a natural language query. At block 504, the service determines whether another portion of the query is associated with one or more codes of an ontology. If so, then the service assigns, based on one or more criteria, one of the associated code(s) to the portion of the natural language query and returns to block 504. If not, then the process proceeds to block 508.

At block 508, the service replaces the portion(s) of the natural language query with different argument placeholder(s) to generate a modified natural language query. At block 510, the service provides the modified natural language query to a trained model. At block 512, the service converts, by the trained model, the modified natural language query into an initial SQL query that includes the argument placeholder(s) and subquery placeholder(s).

At block 514, the service generates a final SQL query based at least on the initial SQL query, predefined subquery template(s) associated with the subquery placeholder(s), and ontology code(s) associated with the argument placeholder(s). At block 516, the service provides, to the client, an indication of the ontology codes and/or the final SQL query.

At block 518, the service receives, from the client, changes for the ontology code(s) or the final SQL query. At block 520, the service updates model(s) based on change(s). At block 522, the service executes the final SQL query to generate result(s). At block 524, the service provides the result(s) to the client.

FIG. 6 is a high-level flowchart illustrating various methods and techniques to implement a user interface for converting a natural language query to an SQL query using ontological codes and placeholders, according to some embodiments.

At block 602, the client (e.g., user) provides a natural language query to an NLQ-SQLQ service. At block 604, the client receives, from the service, an indication of the ontology codes assigned to portion(s) of the query, the one or more intermediate queries, and/or the final SQL query. At block 606, if the client provides/indicates to the service any more changes to be made to the ontology codes assigned to portion(s) of the query, the one or more intermediate queries, and/or the final SQL query, then they are sent to the NLQ-SQLQ service (which processes the changes to generate a new final SQL query and/or update the ontology codes assigned to portion(s) of the query, the one or more intermediate queries, and/or the final SQL query) and the process returns to block 604.

At block 604, if the client does not provide/indicate to the service any more changes to be made to the ontology codes assigned to portion(s) of the query, the one or more intermediate queries, and/or the final SQL query, then at block 608, the client provides, to the service, indication to execute the final SQL query. At block 610, the client receives, from the service, result(s) of the final SQL query. At block 612, the client provides, to the service, feedback regarding the result(s).

In some embodiments, different codes for different types of entities may be assigned to different portions of a natural language query. For example, a code assigned to one portion of the NLQ may identify a drug, while another code assigned to another portion of the NLQ may identify a health condition. In embodiments, a code of a particular ontology may be assigned to one portion of an NLQ, while another code of a different ontology may be assigned to another portion of the NLQ. For example, a code of a particular ontology (e.g., RxNorm) may be assigned to one portion of the NLQ to identify a drug (e.g., "Aspirin"), whereas another code of another ontology (e.g., ICD10CM) may be assigned to another portion of the NLQ to identify a health condition (e.g., "high cholesterol").

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may implement the functionality described herein (e.g., the functionality of the NLQ-SQLQ tool/service and any other components that implement the techniques described herein). The various methods as illustrated in the figures and described herein represent example embodiments of methods. The order of any method may be changed, and various elements may be added, reordered, combined, omitted, modified, etc.

Figure 7:
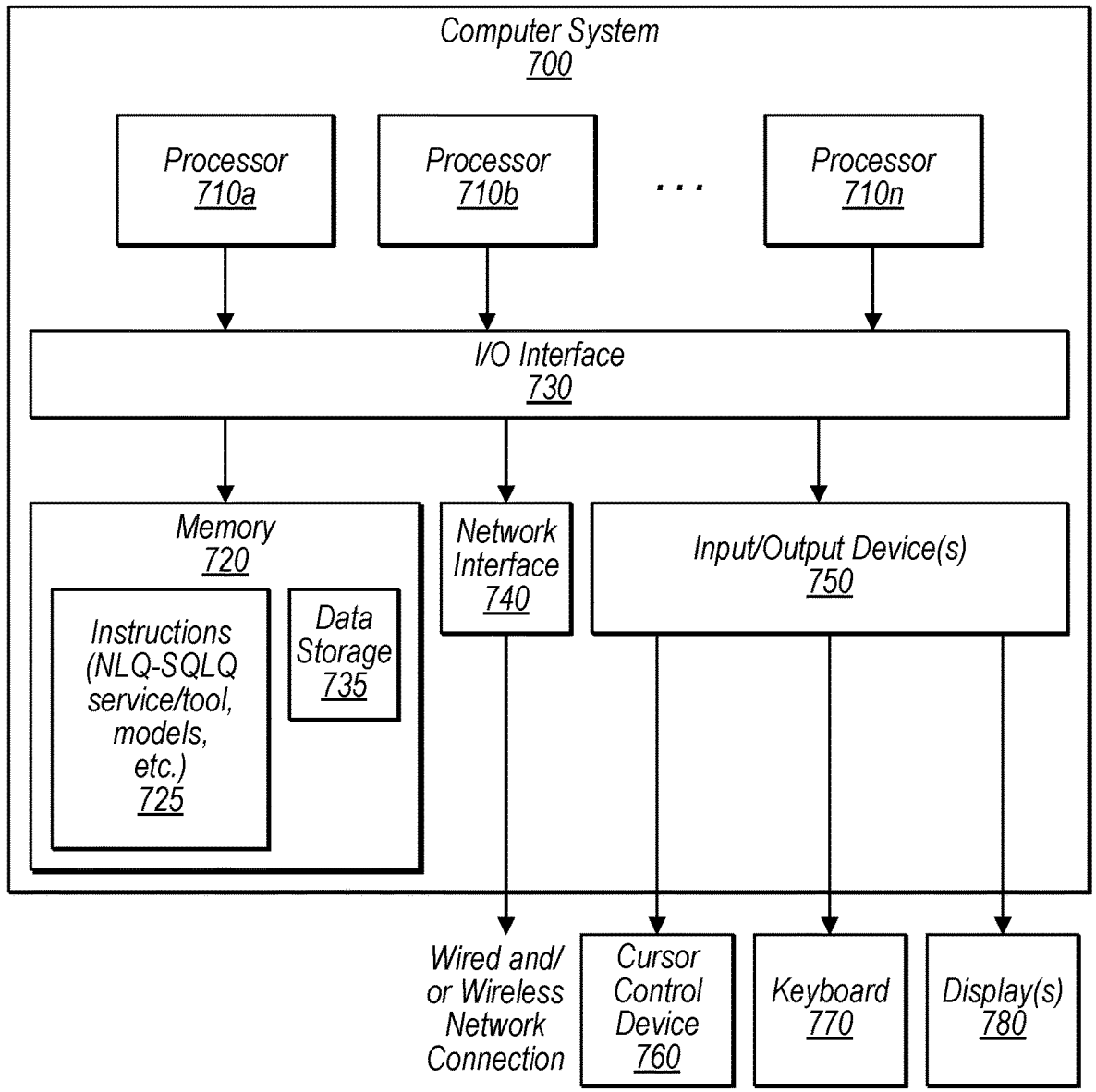
FIG. 7 is a block diagram illustrating an example computing system, according to some embodiments.

Embodiments to implement converting a natural language query to an SQL query using ontological codes and placeholders may by implemented by and/or interact with various systems or devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 720 may store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., NLQ-SQLQ tool/ service and any other components, etc.) are shown stored within system memory 720 as program instructions 725 and data storage 735, respectively. In other embodiments, program instructions and/or data may be received, sent or stored upon different types of computer-accessible media or on similar media separate from system memory 720 or computer system 700. A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be coordinate I/O traffic between processor 710, system memory 720, and any peripheral devices in the device, including network interface 740 or other peripheral interfaces, such as input/ output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725 that implement the various embodiments of the systems as described herein, and data store 735, comprising various data accessible by program instructions 725, in one embodiment. In one embodiment, program instructions 725 may include software elements of embodiments as described herein and as illustrated in the Figures. Data storage 735 may include data that may be used in embodiments (e.g., models, ontologies, codes, predefined subquery templates, database data/mappings, etc.). In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 700 may be transmitted to computer system 700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors of a provider network, cause the one or more processors to, for individual ones of a plurality of clients of the provider network, implement an NLQ-SQLQ service to:
 receive, from a client via an interface of the NLQ-SQLQ service, a natural language query;
 for one or more portions of the natural language query:
  determine that the portion of the natural language query is associated with one or more codes of an ontology, wherein a given ontology comprises a plurality of codes that are respectively associated with one or more words; and
  assign, based on one or more criteria, one of the one or more codes to the portion of the natural language query;
 replace the one or more portions of the natural language query with a different argument placeholder to generate a modified natural language query comprising one or more argument placeholders, wherein the one or more argument placeholders for the one or more portions are associated with the one or more codes assigned to the one or more portions;
 provide the modified natural language query as input to a trained model, wherein the trained model is selected for generating SQL queries based at least on a configuration input received by the NLQ-SQLQ service;
 convert, by the trained model, the modified natural language query into an initial structured query language (SQL) query, wherein the initial SQL query comprises the one or more argument placeholders and one or more subquery placeholders;
 generate a final SQL query based at least on:
  the initial SQL query that was previously generated by the NLQ-SQLQ service before the final SQL query based on the modified natural language query,
  replacement of the one or more subquery placeholders located within the initial SQL query that was generated by the trained model with the one or more predefined SQL subquery templates that were previously selected based at least on configuration input previously received by the NLQ-SQLQ service from the client, and
  the one or more codes associated with the one or more argument placeholders of the initial SQL query that was previously generated by the NLQ-SQLQ service before the final SQL query;
 execute the final SQL query to generate one or more results; and
 provide, via the interface of the NLQ-SQLQ service, the one or more results to the client.

2. The system as recited in claim 1, wherein the trained model is trained based at least on data associated with the healthcare and life sciences domain, and wherein to determine that the portion of the natural language query is associated with the one or more codes of an ontology, the instructions, when executed by the one or more processors, cause the one or more processors to:
determine that the portion of the natural language query is associated with one or more codes of a medical ontology.

3. The system as recited in claim 1, wherein to generate a final SQL query the instructions, when executed by the one or more processors, further cause the one or more processors to:
modify the one or more predefined SQL subquery templates to include the one or more codes.

4. The system as recited in claim 1, wherein the instructions, when executed by the one or more processors, further cause the one or more processors to:
provide, to the client, an indication of the one or more codes assigned to the one or more portions of the natural language query;
receive, from the client, an indication to change a particular one of the one or more codes that is assigned to a particular one of the one or more portions of the natural language query to a different code; and
in response to the reception of the indication to change the particular code to the different code, assign the different code to the particular portion of the natural language query.

5. The system as recited in claim 1, wherein the instructions, when executed by the one or more processors, further cause the one or more processors to:
provide, to the client, an indication of the final SQL query;
receive, from the client, a modification to be applied to the final SQL query; and
in response to the reception of the modification to be applied to the final SQL query, apply the modification to the final SQL query before the execution of the final SQL query.

6. A method, comprising:
performing, by an NLQ-SQLQ service implemented by one or more computing devices of a provider network:
 receiving, from a client via an interface of the NLQ-SQLQ service, a natural language query;

for one or more portions of the natural language query:
assigning, based on one or more criteria, one of a plurality of codes of an ontology to the portion of the natural language query;
generating, by a trained model, an initial structured query language (SQL) query based at least on the natural language query, wherein the trained model is selected for generating SQL queries based at least on a configuration input received by the NLQ-SQLQ service, and wherein the initial SQL query comprises one or more argument placeholders that correspond to the one or more portions of the natural language query and one or more subquery placeholders, wherein the one or more argument placeholders are associated with the one or more codes assigned to the one or more portions;
generating a final SQL query based at least on:
the initial SQL query that was previously generated by the NLQ-SQLQ service before the final SQL query based on the modified natural language query,
replacement of the one or more subquery placeholders located within the initial SQL query that was generated by the trained model with the one or more predefined SQL subquery templates that were previously selected based at least on configuration input previously received by the NLQ-SQLQ service from the client, and
the one or more codes associated with the one or more argument placeholders of the initial SQL query that was previously generated by the NLQ-SQLQ service before the final SQL query;
executing the final SQL query to generate one or more results; and
provide, via the interface of the NLQ-SQLQ service, the one or more results to the client.

7. The method as recited in claim 6, further comprising:
receiving, via the interface of the NLQ-SQLQ service, the configuration input, wherein the configuration indicates one or more of:
the selection of the trained model from among a plurality of trained models available for selection, or
the selection of the predefined SQL subquery templates from among a plurality of predefined SQL subquery templates available for selection.

8. The method as recited in claim 7, wherein different codes of the plurality of codes are assigned to different portions of the natural language query, wherein the code assigned to the portion of the natural language query identifies a drug, and wherein another code assigned to another portion of the natural language query identifies a health condition.

9. The method as recited in claim 6, wherein generating a final SQL query comprises:
modifying the one or more predefined SQL subquery templates to include the one or more codes.

10. The method as recited in claim 6, further comprising:
providing, to the client, an indication of the final SQL query;
receiving, from the client, a modification to be applied to the final SQL query; and
in response to receiving the modification to be applied to the final SQL query, applying the modification to the final SQL query before the execution of the final SQL query.

11. The method as recited in claim 6, wherein assigning, based on one or more criteria, one of a plurality of codes of an ontology to the portion of the natural language query comprises:
determining that the portion of the natural language query is associated with a plurality of codes of the ontology;
calculating, based at least on analysis of the natural language query, different confidence values for the plurality of codes of the ontology, wherein a given confidence value for a given code is proportional to a likelihood that the given code is a correct match for the portion of the natural language query; and
determining that a confidence level calculated for the code is highest among the different confidence values for the plurality of codes.

12. The method as recited in claim 6, further comprising:
for another portion of the natural language query:
assigning, based on the one or more criteria, another code of a different ontology to the other portion of the natural language query.

13. The method as recited in claim 12, wherein the ontology and the other ontology are medical ontologies, wherein the code assigned to the portion of the natural language query identifies a drug, and wherein the other code assigned to the other portion of the natural language query identifies a health condition.

14. The method as recited in claim 6, wherein generating the initial SQL query based at least on the natural language query comprises generating, using at least a trained model, the initial SQL query based at least on the natural language query, and further comprising:
receiving, from the client, feedback regarding one or more of the initial SQL query, the final SQL query, or the one or more results; and
based on receiving the feedback, perform one or more updates to the trained model.

15. One or more non-transitory computer-accessible storage media storing program instructions that when executed on or across one or more processors of a provider network cause the one or more processors to implement an NLQ-SQLQ service to:
receive, from a client via an interface of the NLQ-SQLQ service, a natural language query;
for one or more portions of the natural language query:
assign, based on one or more criteria, one of a plurality of codes of an ontology to the portion of the natural language query;
generate, by a trained model, an initial structured query language (SQL) query based at least on the natural language query, wherein the trained model is selected for generating SQL queries based at least on a configuration input received by the NLQ-SQLQ service, and wherein the initial SQL query comprises one or more argument placeholders that correspond to the one or more portions of the natural language query and one or more subquery placeholders, wherein the one or more argument placeholders are associated with the one or more codes assigned to the one or more portions;
generate a final SQL query based at least on:
the initial SQL query that was previously generated by the NLQ-SQLQ service before the final SQL query based on the modified natural language query,
replacement of the one or more subquery placeholders located within the initial SQL query that was generated by the trained model with the one or more predefined SQL subquery templates that were previously selected based at least on configuration input previously received by the NLQ-SQLQ service from the client, and the one or more codes associated with the one or more argument placeholders of the initial SQL query that was previously generated by the NLQ-SQLQ service before the final SQL query;

execute the final SQL query to generate one or more results; and provide, via the interface of the NLQ-SQLQ service, the one or more results to the client.

16. The one or more non-transitory computer-accessible storage media as recited in claim 15, wherein to assign, based on one or more criteria, one of a plurality of codes of an ontology to the portion of the natural language query, the program instructions when executed on or across the one or more processors further cause the one or more processors to:

determine that the portion of the natural language query is associated with the code of the plurality of codes of a medical ontology.

17. The one or more non-transitory computer-accessible storage media as recited in claim 15, wherein the program instructions when executed on or across the one or more processors further cause the one or more processors to:

receive, via the interface of the NLQ-SQLQ service, additional configuration input, wherein the additional configuration input indicates:

selection of a model or model service from among a plurality of models or model services available for selection, wherein the selected model or model service performs the assignment of the one of a plurality of codes of an ontology to the portion of the natural language query.

18. The one or more non-transitory computer-accessible storage media as recited in claim 15, wherein the program instructions when executed on or across the one or more processors further cause the one or more processors to:

provide, to the client, an indication of the one or more codes assigned to the one or more portions of the natural language query;

receive, from the client, an indication to change a particular one of the one or more codes that is assigned to a particular one of the one or more portions of the natural language query to a different code; and in response to the reception of the indication to change the particular code to the different code, assign the different code to the particular portion of the natural language query.

19. The one or more non-transitory computer-accessible storage media as recited in claim 18, wherein the program instructions when executed on or across the one or more processors further cause the one or more processors to:

perform one or more updates to a classification model based on one or more of the different code, the particular portion of the natural language query, and one or more other portions of the natural language query.

20. The one or more non-transitory computer-accessible storage media as recited in claim 15, wherein the program instructions when executed on or across the one or more processors further cause the one or more processors to:

provide, to the client, an indication of the final SQL query;

receive, from the client, a modification to be applied to the final SQL query; and in response to the reception of the modification to be applied to the final SQL query, apply the modification to the final SQL query before the execution of the final SQL query.

* * * * *